US012731017B2

(12) United States Patent
Mangalore et al.

(10) Patent No.: US 12,731,017 B2
(45) Date of Patent: Sep. 8, 2026

(54) CONIC PROGRAMMING BASED ON NEURAL NETWORK WITH SPIKING NEUROMORPHIC ARCHITECTURE

(71) Applicant: Intel Corporation, Santa Clara, CA (US)

(72) Inventors: Ashish Rao Mangalore, Munich (DE); Gabriel Andres Fonseca Guerra, Munich (DE); Sumedh Risbud, Berkeley, CA (US); Philipp Stratmann, Bonn (DE); Andreas Wild, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/308,152

(22) Filed: Apr. 27, 2023

(65) Prior Publication Data

US 2023/0259749 A1 Aug. 17, 2023

Related U.S. Application Data

(60) Provisional application No. 63/489,814, filed on Mar. 13, 2023.

(51) Int. Cl.
*G06N 3/063* (2023.01)

(52) U.S. Cl.
CPC .................................... *G06N 3/063* (2013.01)

(58) Field of Classification Search
CPC ...................................................... G06N 3/063
USPC ............................................................ 706/27
See application file for complete search history.

(56) References Cited

U.S. PATENT DOCUMENTS

| | | | | |
|---|---|---|---|---|
| 12,026,619 | B1 * | 7/2024 | Berman | G06N 3/04 |
| 2015/0106310 | A1 * | 4/2015 | Birdwell | G06N 3/063 706/26 |
| 2019/0370653 | A1 * | 12/2019 | Chakrabartty | G06N 3/049 |

OTHER PUBLICATIONS

Trinh et al., "Efficient data encoding for convolutional neural network application", ACM Trans. On architecture and code optimization, vol. 11, No. 4, Article 49, Dec. 2014 (Year: 2014).*
Reklaitis et al., "Generalized Hopfield Networks and Nonlinear Optimization", NIPS'19, 2019 (Year: 2019).*

(Continued)

*Primary Examiner* — Tsu-Chang Lee
(74) *Attorney, Agent, or Firm* — Akona IP PC

(57) ABSTRACT

A neural network, which can solve conic optimization problems may include a first layer, a second layer, and a third layer. The first layer includes first neurons encoding constraint coefficients of the conic optimization problem. The second layer includes second neurons encoding decision variables of the conic optimization problem. The third layer includes an integrator neuron. Data may be sent from a first neuron to a second neuron or from the second neuron to the first neuron. A neuron, after receiving data from another neuron, may update its internal state parameter based on the data and the weight of the connection between the two neurons. The communication may be triggered by the internal state parameter of the neuron sending the data meets a criterion. After the internal state parameter of the integrator neuron meets a criterion, the integrator neuron may output a solution to the conic optimization problem.

20 Claims, 12 Drawing Sheets

(56) References Cited

OTHER PUBLICATIONS

Boyd, Stephen et al "Distributed optimization and statistical learning via the alternating direction method of multipliers", Foundations and Trends in Machine Learning, vol. 3, No. 1 (2010), pp. 1-122.
Chambolle, Antonin et al "A first-order primal-dual algorithm for convex problems with applications to imaging", J Math Imaging Vis (2011) 40: 120-145; DOI 10.1007/s10851-010-0251-1.
Davies, Mike et al "Advancing neuromorphic computing with Loihi: A survey of results and outlook", Proceedings of the IEEE, vol. 109, No. 5, May 2021, pp. 911-934.
De Viragh, Yvain et al "Trajectory optimization for wheeled-legged quadrupedal robots using linearized ZMP constraints", IEEE Robotics and Automation Letters. Preprint Version. Accepted Jan. 2019, 8 pages.
Kouzoupis, D., et al "Towards Proper Assessment of QP Algorithms for Embedded Model Predictive Control", 2015 European Control conference (ECC), Jul. 15-17, 2015, Downloaded on Mar. 8, 2023 at 20:27:18 UTC from IEEE Xpl, 8 pages.
Liu, Chao et al "A quadratic programming approach to manipulation in real-time using modular robots", arXiv:2104.02755v2 [cs.RO] Jul. 31, 2021, 25 pages.
Luo, Zhi-Quan et al "An introduction to convex optimization for communications and signal processing", IEEE Journal on Selected Areas in Communications, vol. 24, No. 8, Aug. 2006; Downloaded on Mar. 13, 2009 at 20:52 from IEEE Xplore, pp. 1426-1438.
Malyuta, Danylo et al "Advances in trajectory optimization for space vehicle control", arXiv:2108.02335v2 [math.OC] Aug. 23, 2021, 100 pages.
Muglikar, Manasi et al "ESL: Event-based structured light", arXiv:2111.15510v1 [cs.CV] Nov. 30, 2021, 11 pages.
Nemirovski, Arkadi S. "Interior-point methods for optimization", Acta Numerica (2008), doi: 10.1017/S0962492906370018, pp. 191-234.
Sleiman, Jean-Pierre et al "A unified MPC framework for whole-body dynamic locomotion and manipulation". IEE Robotics and Automation Letters, preprint Version, Accepted Feb. 2021, arXiv:2103.00946v1 [cs.RO] Mar. 1, 2021, 8 pages.
Tapia, Ma. Guadalupe Castillo et al "Applications of multi-objective evolutionary algorithms in economics and finance: A survey", Downloaded on Mar. 9, 2023 at 16:23:53 UTC from IEEE Xplore, pp. 532-539.
Yu, Yue et al "Proportional-integral projected gradient method for conic optimization", arXiv:2108.10260v2 [math.OC] Dec. 13, 2021, 14 pages.
Yu, Yue et al "Propotional-integral projected gradient method for model predictive control", IEEE Control System Letters, available at https://ieeexplore.ieee.org/document/9295329, DOI: 10.1109/LCSYS; rXiv:2009.06980v2 [math.OC] Dec. 18, 2020, pp. 1-6.

* cited by examiner

CONIC PROGRAMMING BASED ON NEURAL NETWORK WITH SPIKING NEUROMORPHIC ARCHITECTURE

CROSS REFERENCE TO RELATED APPLICATION

This application claims the benefit of U.S. Provisional Patent Application No. 63/489,814, filed Mar. 13, 2023, which is incorporated by reference in its entirety.

TECHNICAL FIELD

This disclosure relates generally to conic programming, and more specifically, conic programming based on neural networks with spiking neuromorphic architectures.

BACKGROUND

Conic programming refers to the minimization of a differentiable convex objective function subject to conic constraints. Convex constraining functions can be derived from cones. Conic programming is a generalization of linear programming, quadratic programming, second order cone programming, and semidefinite programming. Conic programs are conic optimization problems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
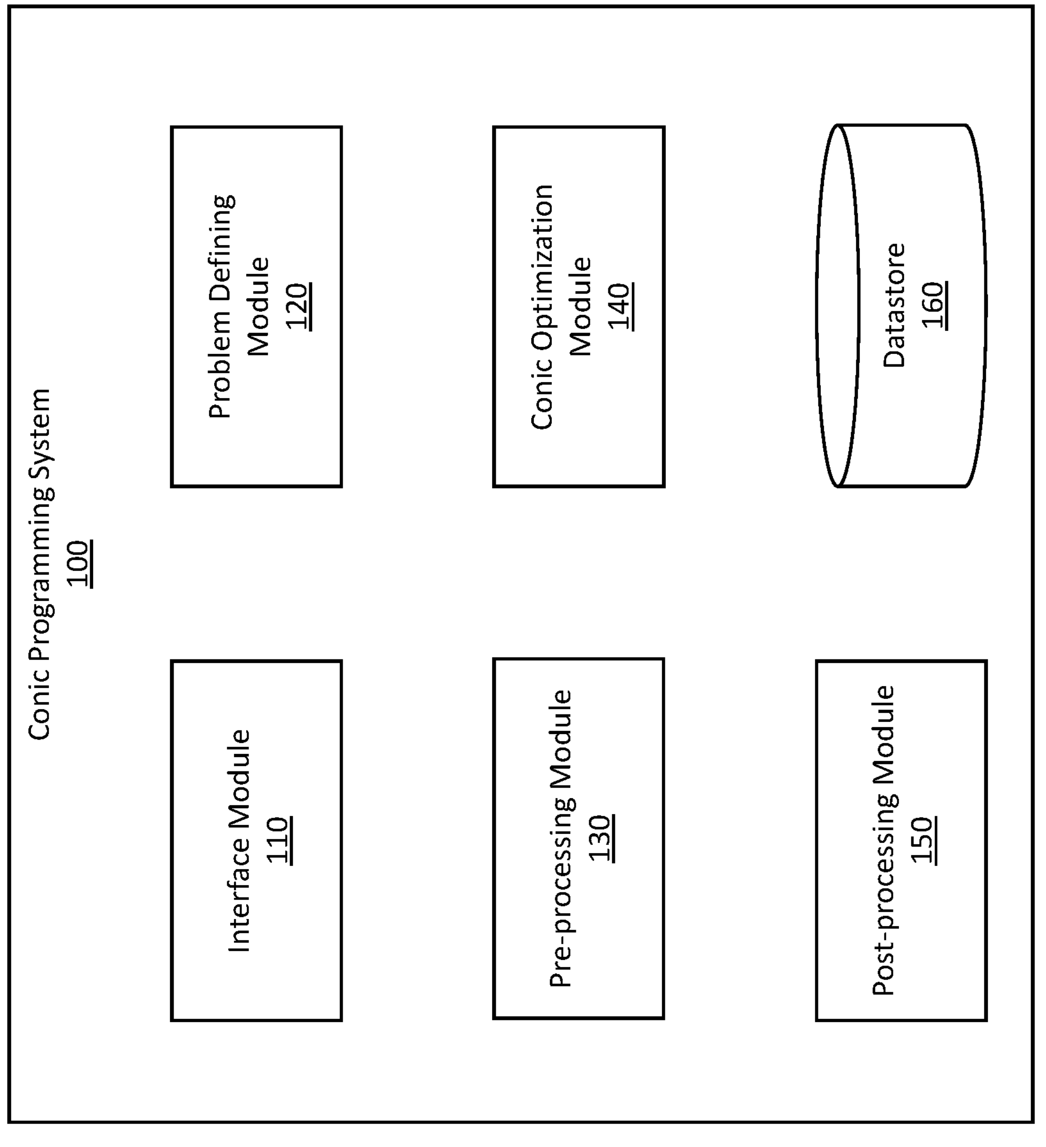
FIG. 1 is a block diagram of a conic programming system, in accordance with various embodiments.

Conic programming has been used in many robotic applications, such as depth sensing, MPC for trajectory optimization, manipulation tasks in robotics, and so on. These applications usually require conic optimization problems to be solved within a limited time in order to operate in real-time. Conic programs and quadratic programs are currently solved on conventional Von Neumann based hardware architectures, e.g., using first-order methods or interior-point methods. Many high dimensional problems (e.g., problems with more than $10^3$ decision variables) that can be parallelized are currently often solved by parallel execution of multiple threads on Von Neumann based hardware, with typical power consumption in the range of $10^1$-$10^2$ Watt. Solving conic programs, which can be parallelized, in real-time applications using conventional hardware architectures are challenging to scale to larger problems. Parallelizing their execution could maintain the time to solution to be constant. However, because of context switching overheads during parallel execution, this may not be the case for larger problems. Moreover, many conventional-hardware-based solutions have the disadvantage of large power consumption.

Many conic optimization problems are encountered in various fields that can have sparse and modular structures. The relations may involve a few out of the many variables. The number of actual relations between decision variables can be much smaller than the number of all possible relations. The design of conventional hardware, such as central processing units (CPUs) and graphics processing units (GPUs), usually fails to fully exploit the sparse and modular structure of such problems. Consequently, the CPU cores may have to operate even if not needed for the computation. Moreover, constant CPU clocking is another reason for larger power consumption as the required operation of large circuits can consume lots of power. The currently available conic programming methods can be undesirably time consuming and power consuming. These methods are not desirable for power-constrained applications or real-time systems. Therefore, improved technologies for conic programming are needed.

Embodiments of the present disclosure may improve on at least some of the challenges and issues described above by providing a conic programming system that can solve conic programs using spiking neural networks. A spiking neural network may include a first layer, a second layer, and a third layer. The first layer includes first neurons encoding constraint coefficients of the conic optimization problem. The second layer includes second neurons encoding decision variables of the conic optimization problem. The third layer includes an integrator neuron. Data may be sent from a first neuron to a second neuron, from a second neuron to a first neuron, from a second neuron to another second neuron, or from a second neuron back to itself. A neuron, after receiving data from another neuron (or itself) through a connection in the spiking neural network, may update its internal state parameter based on the data. In some embodiments, the neuron may update its internal state parameter further based on the weight of the connection. The transmission of the data through the connection may be triggered when the internal state parameter of the neuron sending the data meets a criterion. The internal state variables of the neurons may be updated till the conic optimization problem is solved, e.g., the object function of the conic optimization problem is minimized subject to the constraint coefficients, the object function has reached a target threshold, a time out is exceeded, and so on. The integrator neuron may output the solution to the conic optimization problem.

The spiking neural network may be deployed by hardware that supports spiking neuromorphic architectures. The hardware may be neuromorphic hardware, which can scale especially well for large conic programs, e.g., conic programs with hundreds, thousands, or millions of decision variables. The neuromorphic hardware may be programmable, compute-memory integrated, capable of sparse communication, or implemented with fine-grained parallelism. The present disclosure provides a method based on spiking neuromorphic architectures to solve conic programs, and consequently linear programs, quadratic programs, second order cone programs, and semidefinite programs. Compared with the currently available techniques for solving conic programs, the conic programming system in the present disclosure can solve conic programs (including conic programs of larger scales) timelier with less power consumed.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the input operand of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the input operand of a particular value as described herein or as known in the art.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or systems. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example Conic Programming System

FIG. 1 is a block diagram of a conic programming system 100, in accordance with various embodiments. The conic programming system 100 includes an interface module 110, a problem defining module 120, a pre-processing module 130, a conic optimization module 140, a post-processing module 150, and a datastore 160. In other embodiments, alternative configurations, different or additional components may be included in the conic programming system 100. Further, functionality attributed to a component of the conic programming system 100 may be accomplished by a different component included in the conic programming system 100 or by a different system.

The interface module 110 facilitates communications of the conic programming system 100 with one or more other systems. For example, the interface module 110 may receive data from one or more systems or devices, the operation of which may produce data that can be used to solve conic optimization problems. The data may be used by the problem defining module 120 to set up conic optimization problems. As another example, the interface module 110 may transmit data computed by the conic programming system 100 to one or more systems or devices that may operate based on solutions of conic optimization problems. Examples of systems or devices that send data to or receive data from the interface module 110 may include robots, navigation systems, control systems, beamforming systems, mapping systems, depth measurement systems, and so on.

The problem defining module 120 defines conic optimization problems. The problem defining module 120 may determine the objective function, constraints, and decision variables of a conic optimization problem. In some embodiments, a conic optimization problem may be formulated as:

$$\min f(x),$$

$$\text{s.t. } Hx-g\in \mathbb{V}$$

$$x\in \mathbb{C},$$

where $f$: $\mathbb{R}^n \rightarrow \mathbb{R}$is a differentiable convex objective function, $x\in \mathbb{R}^n$ is a vector of decision variables that has n elements (i.e., n decision variables), $H\in \mathbb{R}^{m\times n}$ and $g\in \mathbb{R}^m$ are constraint coefficients (aka "constraint functions"), $\mathbb{V}\subseteq \mathbb{R}^m$ is a closed convex cone, and $\mathbb{C}\subseteq \mathbb{R}^n$ is a closed convex set. H may be a matrix having a size of m×n. H may denote an affine space defined by a set of affine constraints $h_i(x)=0$, where i is an integer in the range from 1 to m. g may be a vector having m elements. $g\in \mathbb{R}^m$ may be an inequality constraint function. In some embodiments, a conic optimization problem is a problem to minimize a convex function (e.g., $f(x)$) over the intersection of an affine subspace (e.g., $h_i$) and a convex cone (e.g., g). The conic optimization problem may be solved by finding $x\subseteq \mathbb{R}^n$ that can minimize $f(x)$ subject to $g_i(x)\leq 0$, where is i an integer in the range from 1 to m.

In some embodiments, the problem defining module 120 may define various categories of conic programs, such as linear programs, quadratic programs, second order cone programs, and semidefinite programs. For example, quadratic programs may be conic programs of the form:

$$\min \tfrac{1}{2}x^TQx+p^Tx,$$

$$\text{s.t. } Ax\leq k,$$

where $x\in \mathbb{R}^n$ is a vector of decision variables, $A\in \mathbb{R}^{m\times n}$ is matrix of constant normals, $p\in \mathbb{R}^n$ is the linear component of the cost, $k\in \mathbb{R}^m$ is the offset of the constraints and $Q\in \mathbb{S}^{n\times n}$ is a positive-semi-definite matrix. For linear programs, Q=0. As another example, second order cone programs may be conic programs of the form:

$$\min f_x^T,$$

$$\text{s.t. } \|A_i x + k_i\|_2 \leq c_i^T x + d_i i = 1, \ldots, mFx = g$$

where $x\in \mathbb{R}^n$ is a vector of decision variables, $A\in \mathbb{R}^{n_i\times n}$ is matrix of constraint normal, $k\in \mathbb{R}^{n_i}$, $f\in \mathbb{R}^n$, $c_i\in \mathbb{R}^n$, $d_i\in \mathbb{R}$, $F\in \mathbb{R}^{p\times n}$ and $g\in \mathbb{R}^p$. The constraints in the equation are formulated in a way as to lie in the second order cone in $\mathbb{R}^{n_i}$.

In some embodiments, the problem defining module 120 may process data received from the interface module 110 and use the processed data to define a conic optimization problem. For instance, the problem defining module 120 may use data received through the interface module 110 to determine the objective function, one or more constraints, or one or more decision variables of a conic optimization problem.

The pre-processing module 130 pre-process conic optimization problems before the conic optimization problems are solved. In some embodiments, the pre-processing module 130 processes one or more constraint coefficients, one or more decision variables, or other data of a conic optimization problem before the problem is solved, e.g., by the conic optimization module 140. In other embodiments, the pre-processing module 130 may perform computation that is required to solve the conic optimization problem but cannot be performed by the conic optimization module 140, e.g., due to a limitation of hardware associated with the conic optimization module 140. In some embodiments, the problem defining module 120 may include one or more functions, such as linearizers, denoisers, and so on. In an example, the problem defining module 120 may linearize constraints defined by the problem defining module 120. In another example, the problem defining module 120 may reduce or eliminate noise in decision variables defined by the problem defining module 120.

The conic optimization module 140 solves conic optimization problems using neural networks, such as spiking neural networks with spiking neuromorphic architectures. The conic optimization module 140 may encode a conic optimization problem in neurons of a neural network with a spiking neuromorphic architecture. For instance, the conic optimization module 140 may encode the constraints and decision variables as internal state variables of neurons in the neural network. During the interference of the neural network, the internal state variables of the neurons are updated to minimize the differentiable convex objective function subject to the constraint coefficients. After the updating, the internal state variables of some neurons may represent decisions variables that can minimize the differentiable convex objective function subject to the constraint coefficients. The internal state variables may constitute a solution of the conic optimization problem. Certain aspects of the conic optimization module 140 are described below in conjunction with FIG. 2.

The post-processing module 150 processes solutions of conic optimization problems from the conic optimization module 140. In some embodiments, the post-processing module 150 processes one or more decision variables determined by the conic optimization module 140 to make the decision variables more compatible or desirable for the systems or devices that will use the decision variables for various applications. In other embodiments, the post-processing module 150 may perform data processing that is required but cannot be performed by the conic optimization module 140, e.g., due to a limitation of hardware associated with the conic optimization module 140. In an example, the post-processing module 150 may perform line search on decision variables to further minimize the objective function before the decision variables are used. In another example, the post-processing module 150 may reduce or eliminate noise in the decision variables determined by the conic optimization module 140.

The datastore 160 stores data received, generated, or used by the conic programming system 100. The datastore 160 may store data received by the interface module 110. The datastore 160 may also store data generated by the problem defining module 120, the pre-processing module 130, the conic optimization module 140, or the post-processing module 150. In some embodiments, the datastore 160 may also store parameters of neural networks, such internal parameters, hyperparameters, and so on. The datastore 160 may also store one or more settings or attributes of hardware used for training or deploying neural networks.

In some embodiments, the conic programming system 100 may be executed by a compute block that includes one or more processing units. The compute block may be a hybrid compute block that include different types of processing units, which may execute different components of the conic programming system 100. For instance, the compute block may include a first type of processing unit, which is desirable for the pre-processing module 130 or the post-processing module 150, and a second type of processing unit, which is desirable for deploying the neural network. Certain aspects of the compute block are described below in conjunction with FIG. 5.

Figure 2:
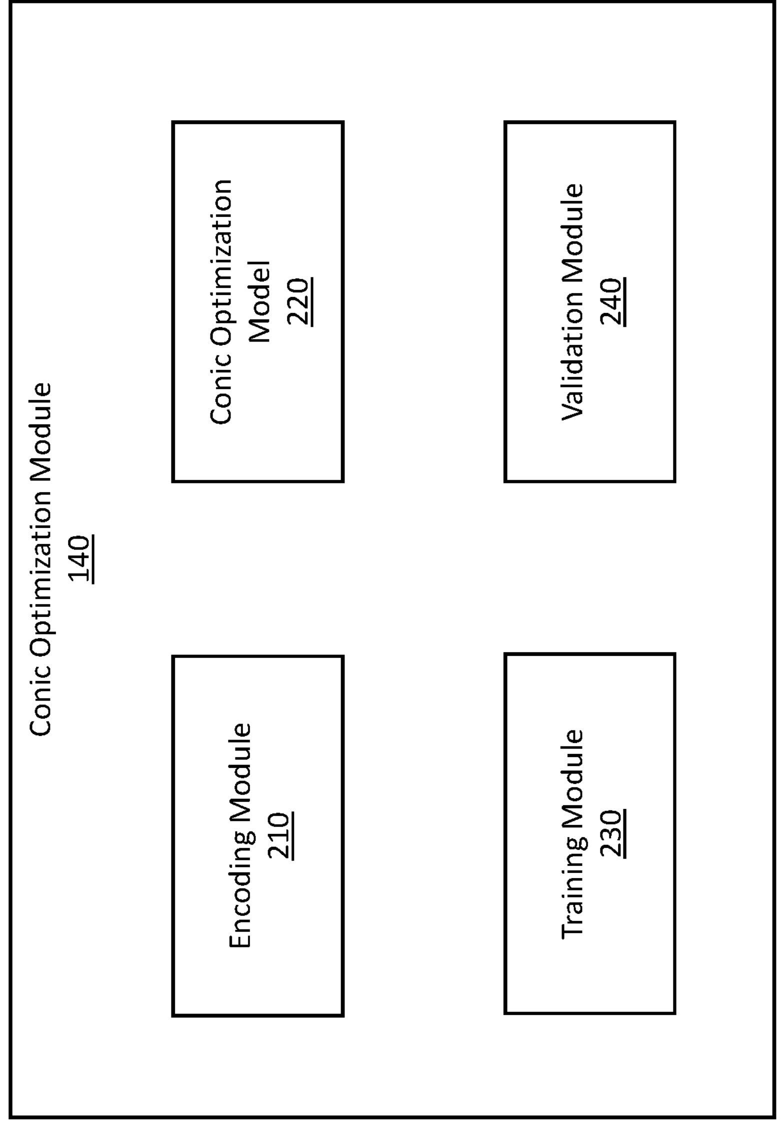
FIG. 2 is a block diagram of a conic optimization module, in accordance with various embodiments.

FIG. 2 is a block diagram of the conic optimization module 140, in accordance with various embodiments. The conic optimization module 140 includes an encoding module 210, a conic optimization model 220, a training module 230, and a validation module 240. In other embodiments, alternative configurations, different or additional components may be included in the conic optimization module 140. Further, functionality attributed to a component of the conic optimization module 140 may be accomplished by a different component included in the conic optimization module 140, a component of the conic programming system 100, or by a different system.

Th encoding module 210 encodes conic optimization problems in the conic optimization model 220. In some embodiments, the encoding module 210 receives information of conic optimization problems from the problem defining module 120 or the pre-processing module 130. The encoding module 210 may encode constraint functions and decision variables of a conic optimization problem as internal state variables of neurons in the conic optimization model 220. The encoding module 210 may encode a constraint function or decision variable as the internal state variable of a neuron. The internal state variables of different neurons may represent different constraint functions or decision variables. In some embodiments, the encoding module 210 may also set up thresholds for neurons in the conic optimization model 220 to spike.

The conic optimization model 220 is a neural network that can solve conic optimization problems. The conic optimization model 220 may be a spiking neural network, such as a neural network with a spiking neuromorphic architecture. The conic optimization model 220 includes a plurality of neurons. During an inference of the conic optimization model 220, internal state variables of some or all the neurons may be updated till a solution to the conic optimization problem is found. In some embodiments, the neurons are arranged in layers. For instance, the conic optimization model 220 may include a first layer including one or more neurons encoding the constraint coefficient and a second layer including one or more neurons encoding the decision variables. The layers may be arranged in a sequence. For instance, the first layer may be arranged before the second layer. In other embodiments, the conic optimization model 220 may include a different number of layers. For instance, conic optimization model 220 may include a third layer arranged after the second layer. The third layer may include a neuron encoding the solution. The output of the third layer may constitute a solution to the conic optimization problem.

The layers of conic optimization model 220 are communicatively connected. For instance, data computed by the first layer may be transmitted to the second layer, and vice versa. Neurons in the same layer may also be communicatively connected. Neurons in the neuron network may exchange spiking signals, such as binary spiking signals, graded spiking signals, etc. For instance, a neuron may receive a spiking signal from another neuron or transmit a spiking signal to another neuron. A neuron may update its internal state variable based on data from one or more other neurons that are in communicative connection with the neuron. A connection between the neuron and another neuron may have a weight. The neuron may compute a product of the data from the other neuron with the weight. In embodiments where the neuron receives data from multiple neurons, the neuron may compute multiple products and accumulate the product to update its internal state variable. The conic optimization model 220 may include feedforward connections (e.g., directed connection from a neuron to one or more other neurons) and recurrent connections (e.g., directed connection of a neuron back to the neuron itself). Certain aspects of the conic optimization model 220 are described below in conjunction with FIG. 3.

The training module 230 trains the conic optimization model 220, e.g., by using a training dataset. The training module 230 may form the training dataset. The training dataset includes training samples and training labels. A training sample may be a conic optimization problem. The training sample may have a training label that is a verified or known solution to the conic optimization problem. The training process may determine internal parameters of the conic optimization model 220, such as weights of the connections in the conic optimization model 220.

The training module 230 may determine hyperparameters for training the conic optimization model 220. Hyperparameters are variables specifying the training process. Hyperparameters are different from the internal parameters of the conic optimization model 220. In some embodiments, hyperparameters include variables determining the architecture of the conic optimization model 220, such as number of layers, etc. Hyperparameters also include variables which determine how the conic optimization model 220 is trained, such as batch size, number of epochs, etc. A batch size defines the number of training samples to work through before updating the internal parameters of the conic optimization model 220. The batch size may be the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the internal parameters of the conic optimization model 220. An epoch may include one or more batches. The number of epochs may be 11, 110, 500, 1100, or even larger.

During the training process, the training module 230 may input the training dataset into the conic optimization model 220. The training module 230 may train the DNN for a predetermined number of epochs. The number of epochs is a hyperparameter that defines the number of times that the neural network algorithm will work through the entire training dataset. One epoch means that each sample in the training dataset has had an opportunity to update internal parameters of the DNN. After the training module 230 finishes the predetermined number of epochs, the training module 230 may stop updating the internal parameters of the conic optimization model 220. The conic optimization model 220 having the updated internal parameters is considered trained.

In some embodiments, the training module 230 may continuously train the conic optimization model 220 after the training process is completed. For instance, after the conic optimization model 220 is trained and solves a conic optimization problem, the training module 230 may use the conic optimization problem as a new training sample further train the conic optimization model 220. The training module may receive information indicating whether the solution determined by the conic optimization model 220 is correct and use the information to generate a training label for the new training sample.

The validation module 240 verifies accuracy of the conic optimization model 220 after the training process. In some embodiments, the validation module 240 inputs samples in a validation dataset into the conic optimization model 220 and uses the outputs of the conic optimization model 220 to determine the model accuracy. In some embodiments, a validation dataset may be formed of some or all the samples in the training dataset. Additionally or alternatively, the validation dataset includes additional samples, other than those in the training sets. In some embodiments, the validation module 240 determines may determine an accuracy score measuring the precision, recall, or a combination of precision and recall of the DNN. The validation module 240 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 240 may compare the accuracy score with a threshold score. In an example where the validation module 240 determines that the accuracy score of the conic optimization model 220 is lower than the threshold score, the validation module 240 instructs the training module 230 to re-train the conic optimization model 220. In one embodiment, the training module 230 may iteratively re-train the conic optimization model 220 until the occurrence of a stopping condition, such as the accuracy measurement indication that the DNN may be sufficiently accurate, or a number of training rounds having taken place.

Example Neural Network

Figure 3:
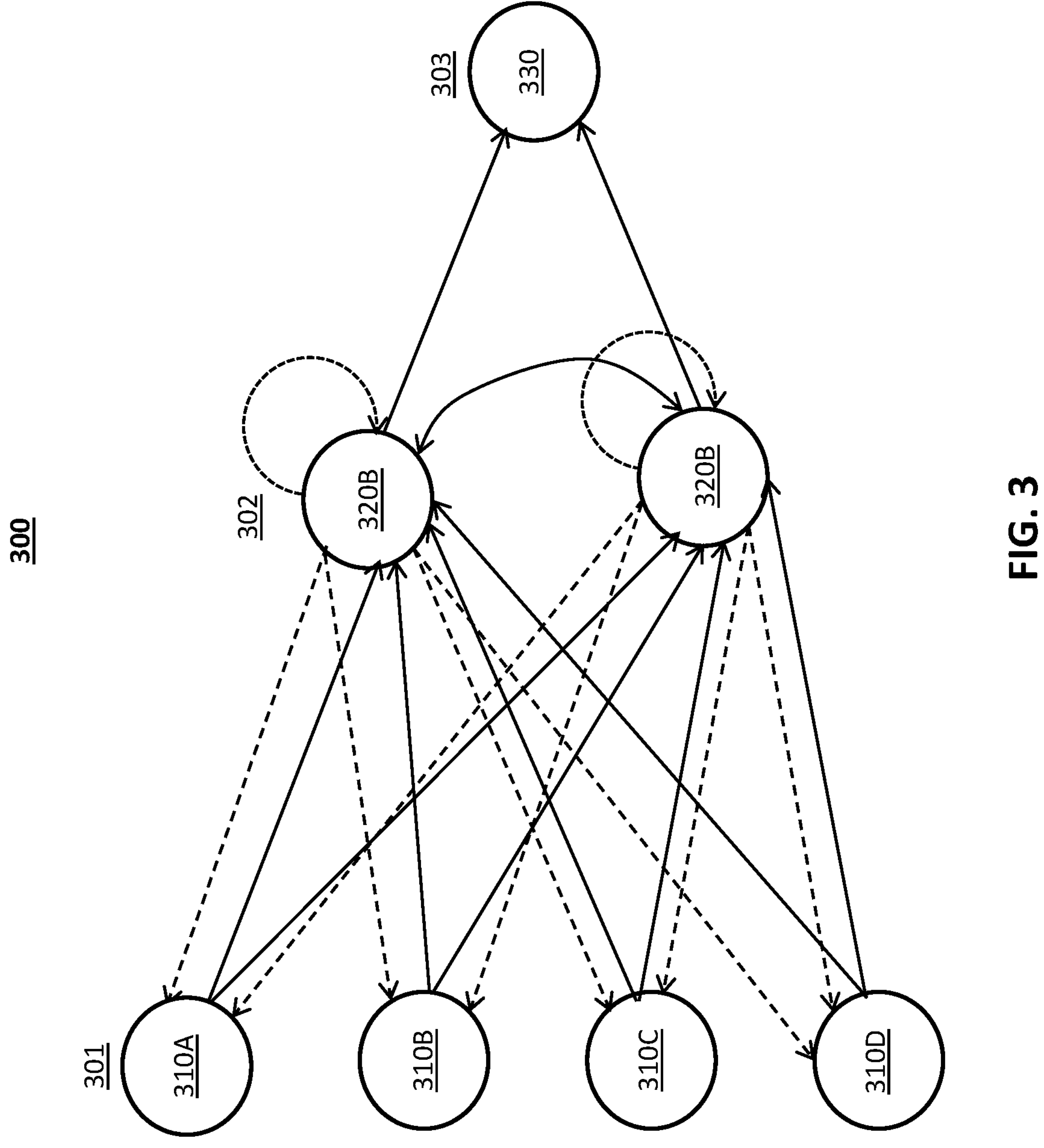
FIG. 3 illustrates an example neural network for solving a conic optimization problem, in accordance with various embodiments.

FIG. 3 illustrates an example neural network 300 for solving a conic optimization problem, in accordance with various embodiments. The neural network 300 may be a spiking network, such as a network having a spiking neuromorphic architecture. The neural network 300 may be an embodiment of the conic optimization model 220 in FIG. 2. As shown in FIG. 3, the neural network 300 includes three layers 301, 302, and 303 in a sequence. The layer 302 is between the layer 301 and the layer 303. The layer 301 includes four neurons 310A-310D (collectively referred to as "neurons 310" or "neuron 310"). The layer 302 includes two neurons 320A and 320B (collectively referred to as "neurons 320" or "neuron 320"). The layer 303 includes one neuron 330. In other embodiments, the neural network 300 may include a different number of layers. A layer may include a different number of neuron(s).

The internal state variables of the neurons 310 represent constraint functions of the conic optimization problem. The neurons 310 are also referred to as "constraint neurons." In some embodiments, each neuron 310 corresponds to a different or separate constraint function of the conic optimization problem. In an example where the conic optimization problem has an affine space $H\in \mathbb{R}^{m\times n}$ and an inequality constraint function $g\in \mathbb{R}^m$, the layer 301 may include m constraint neurons. The neurons 310 may check constraints of the conic optimization problem. For instance, the neurons 310 may determine whether one or more constraints of the conic optimization problem are met. In some embodiments, a neuron 310 may spike, i.e., send out a spiking signal which may be binary or graded, after the internal state variable of the neuron 310 meets a criterion. The criterion may be a threshold. In an example, the threshold may be g. The signal from a neuro 310 may be transmitted to the layer 302, e.g., to at least one of the neurons 320.

The internal state variables of the neurons 320 represent decision variables of the conic optimization problem. The neurons 310 are also referred to as "variable neurons." In the example where the conic optimization problem has an affine space $H\in \mathbb{R}^{m\times n}$ and an inequality constraint function $g\in \mathbb{R}^m$, the layer 302 may include n variable neurons. Each neuron 320 may encode one or more decision variables in a respective dimension.

In some embodiments, a neuron 320 may receive a bias input (aka "bias"). The bias input may be determined based on the convex objective function of the conic optimization problem. A bias may be an additional parameter in the neural network 300. A bias can be used to offset the output. The bias input may be used to adjust the output along with the weighted sum of the inputs to the neuron 320. For instance, the neuron 320 may add the bias input with the weighted sum to compute the final output of the neural 320. It can help the model in a way that it can fit best for the given data. In some embodiments, the bias input can help the model to shift an activation function towards the positive or negative side.

In some embodiments, the layer 301 and the layer 302 are communicatively connected. The connection may be bidirectional, i.e., outputs of the layer 301 may be transmitted to the layer 302 and outputs of the layer 302 may be transmitted to the layer 301. Also, the neurons 320 in the layer 302 may be communicatively connected with each other. The connection within the layer 302 may be bidirectional. The layer 302 may also have recurrent connections, e.g., a connection from a neuron 320 back to the neuron 320 itself. Also, the neurons 320 are communicatively connected to the neuron 330 in the layer 303. The connections within the neural network 300 are represented as arrows in FIG. 3. The connections from neurons 310 to neurons 320, the connections between the neurons 320, and the connections from neurons 320 to the neuron 330 are represented by arrows of solid lines. The connections from neurons 320 to neurons 310 are represented by arrows of dash lines. The recurrent connections of the neurons 320 are represented by arrows of dotted lines.

In some embodiments, a neuron 320 may transmit a spiking signal to one or more neurons 310, and the spiking signal may represent one or more decision variables. The one or more neurons 310, after receiving the spiking signal, may determine whether the one or more decision variables meet one or more constraints of the conic optimization problem. The one or more neurons 310 may update their internal state variables based on the spiking signal received from the neuron 320. Also, the one or more neurons 310 may transmit a spiking signal back to the neuron 320 or the other neuron 320 after the internal state variable(s) of the one or more neurons 310 meet the corresponding criterion (or criteria). A neuron 320 may update its internal state variable based on a spiking signal received from one or more neurons 310, the other neuron 320, itself, or some combination thereof. The process of updating the internal state variable of the neuron 320 may include updating one or more decision variables encoded in the neuron 320.

In some embodiments, a connection in the neural network 300 may be associated with a weight. The neuron (e.g., a neuron 310 or 320), which receives an input from the other neuron through the connection, may update its internal state variable by multiplying the input with the weight. The weights of the connections in the neural network 300 may be determined by training the neural network 300.

A neuron 320 may determine whether its internal state variable meets one or more criteria. An example criterion may be that the convex objective function is minimized. The neuron 320 may determine whether the convex objective function is minimized through its internal computation. After determining that the convex objective function is minimized, the neuron 320 may spike and send the spiking signal to itself through a recurrent connection. Another criterion may be that one or more constraints are satisfied. The neuron 320 may determine whether one or more constraints are satisfied based on inputs from one or more neurons 310. After the criteria are met, the neuron 320 may send out a spiking signal to the neuron 330. The spiking signal may represent one or more decision variables that may constitute at least part of a solution to the conic optimization problem.

The neuron 330 may be an integrator neuron that integrates decision variables from the neurons 320. The neuron 330 may be associated with a threshold n. The neuron 330 may spike after the threshold is reached. For instance, the neuron 330 may output a vector of decision variables having a size of n. The vector of decision variables constitutes a solution to the conic optimization problem. The output of the neuron 330 may be the output of the neural network 300.

Figure 4C:
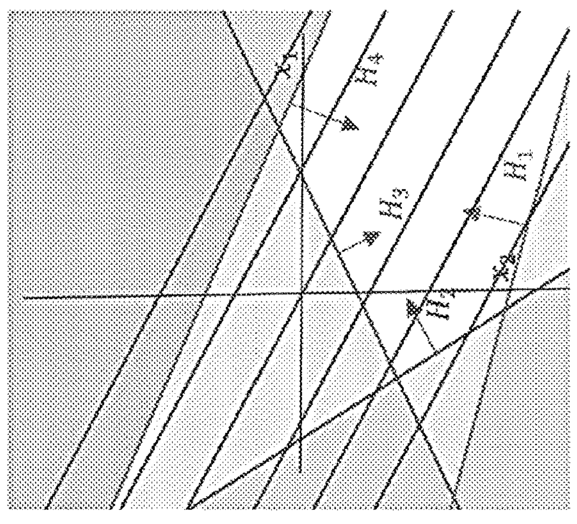
FIGS. 4A-4C illustrate example energy landscapes for various classes of conic programs, in accordance with various embodiments.
Figure 4B:
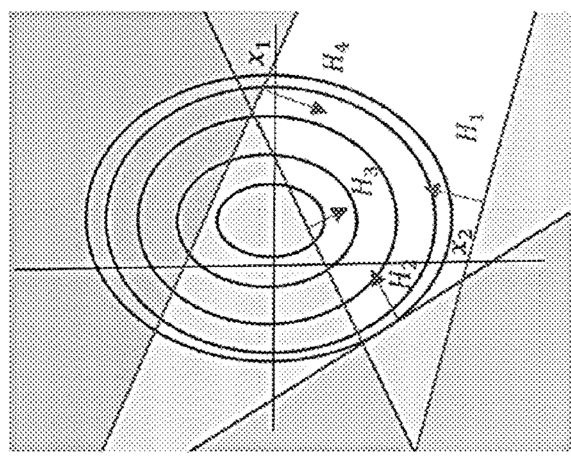
Figure 4A:
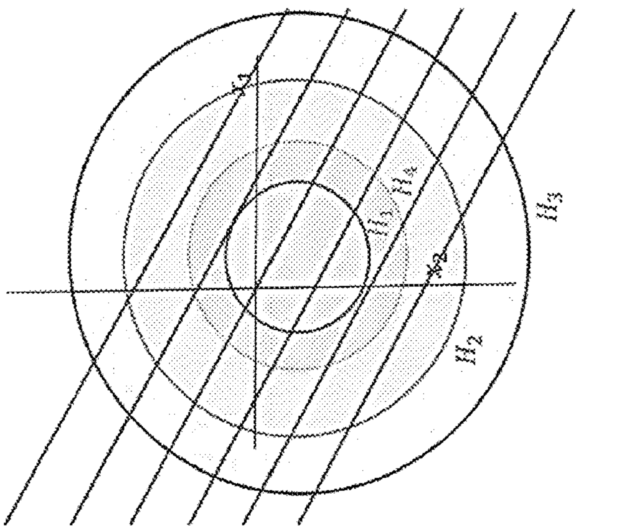

FIGS. 4A-4C illustrate example energy landscapes for various classes of conic programs, in accordance with various embodiments. The conic programs may be run by using a neural network, such as the neural network 300. The energy landscapes of the conic programs may depend on the connectivity of the neural network, intrinsic biases defined for the neurons in the neural network, and so on. The shaded planes in FIGS. 4A-4C correspond to the constraint neurons in the neural network. FIG. 4A illustrates an energy landscape of a conic program over which a neural network tries to minimize the cost function. The conic program in the embodiments of FIG. 4A has constraints defining a cone and a linear cost. FIG. 4B illustrates an energy landscape of a quadratic program over which a neural network tries to minimize the cost function. The quadratic program has convex bowl defined by the cost function and the constraints of the quadratic program are the linear planes. FIG. 4C illustrates an energy landscape of a linear program over which a neural network tries to minimize the cost function. The dynamics of the neural network can minimize the energy of the cost function in the conic programs.

Example Compute Block

Figure 5:
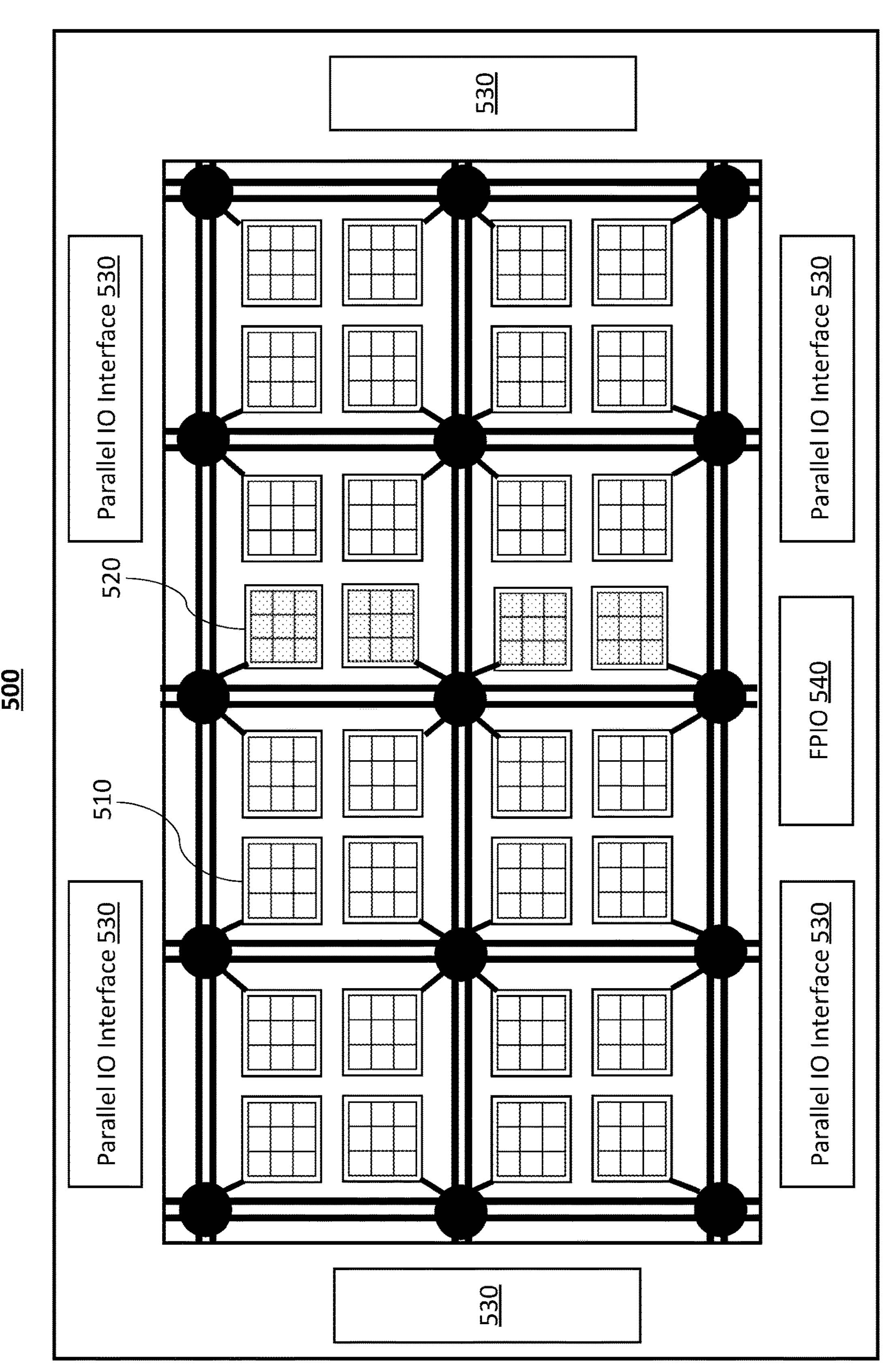
FIG. 5 illustrates an example compute block for solving conic optimization problems, in accordance with various embodiments.

FIG. 5 illustrates an example compute block 500 for solving a conic optimization problem, in accordance with various embodiments. The compute block 500 may provide the hardware to execute some or all components of the conic programming system 100 in FIG. 1. The compute block 500 includes compute units 510 (individually referred to as "compute unit 510"), compute units 520 (individually referred to as "compute unit 520"), parallel input/output (IO) interfaces 530 (individually referred to as "parallel IO interface 530"), and a tour pin input/output (FPIO) interface 540. In other embodiments, alternative configurations, different or additional components may be included in the compute block 500. For example, the compute block 500 may include a different number of compute unit, parallel IO interface, or FPIO interface. As another example, the layout of the compute units 510 and 520 may be different. Further, functionality attributed to a component of the compute block 500 may be accomplished by a different component included in the compute block 500 or by a compute block.

The compute units 510 can train or deploy spiking neural networks, such as the conic optimization model 220 in FIG. 2 or the neural network 300 in FIG. 3. A compute unit 510 may be referred to as a neural core. A neural core may include a plurality of neurons that may be integrated together. For the purpose of illustration, a compute unit 510 includes nine neurons in FIG. 5. In other embodiments, a compute unit 510 may include a different number of neurons. For instance, the number of neurons in a compute unit 510 may be in a range from 100 to 1000. A compute unit 510 may be associated with a limited internal memory that can be accessed by the neurons during execution. In some embodiments, a compute unit 510 can encode one or more decision variables or one or more constraints of a conic optimization problem. The number of decision variable(s) or constraint(s) encoded in a compute unit 510 may depend on one or more attributes of the conic optimization problem, one or more parameters of the neural network solving the conic optimization problem, or other factors.

The neurons can communicate with each other asynchronously using binary (single-bit) or graded (multiple-bit) spikes or messages. In some embodiments, some or all the compute units 510 may be devoid of a clock. The notion of a time-step may be maintained by a synchronization process that is a handshaking mechanism between the compute units 510 that is run when the spikes generated for each compute unit 510 are sent out. This can flush out all the remaining spiking activity and prepares the compute units 510 for the next algorithmic time-step. Message passing can be done by using physical interconnects between the compute unit 510 or between neurons. The physical interconnects are represented by the dark lines and black circles in FIG. 5.

A compute unit 520 may be a CPU or part of a CPU (e.g., compact Von Neumann CPUs). The compute units 520 may execute special functions not tenable on the computing units 510, e.g., some or all functions of the pre-processing module 130 or the post-processing module 150. In some embodiments, the compute units 520 are implemented on the same chip(s) as the compute units 510. In other embodiments, the compute units 520 are implemented on separate chips from the compute units 510.

The chip(s) can be scaled to increase the number of compute units 510 or 520, e.g., to accommodate conic programs of larger sizes. The chip-to-chip communication may be facilitated using the parallel IO interfaces 530 or the FPIO interface 540. The parallel IO interfaces 530 or the FPIO interface 540 can also offer support for Ethernet-based communication or other types of communications, such as slow serial communication.

Example Conic Programming Process

Figure 6:
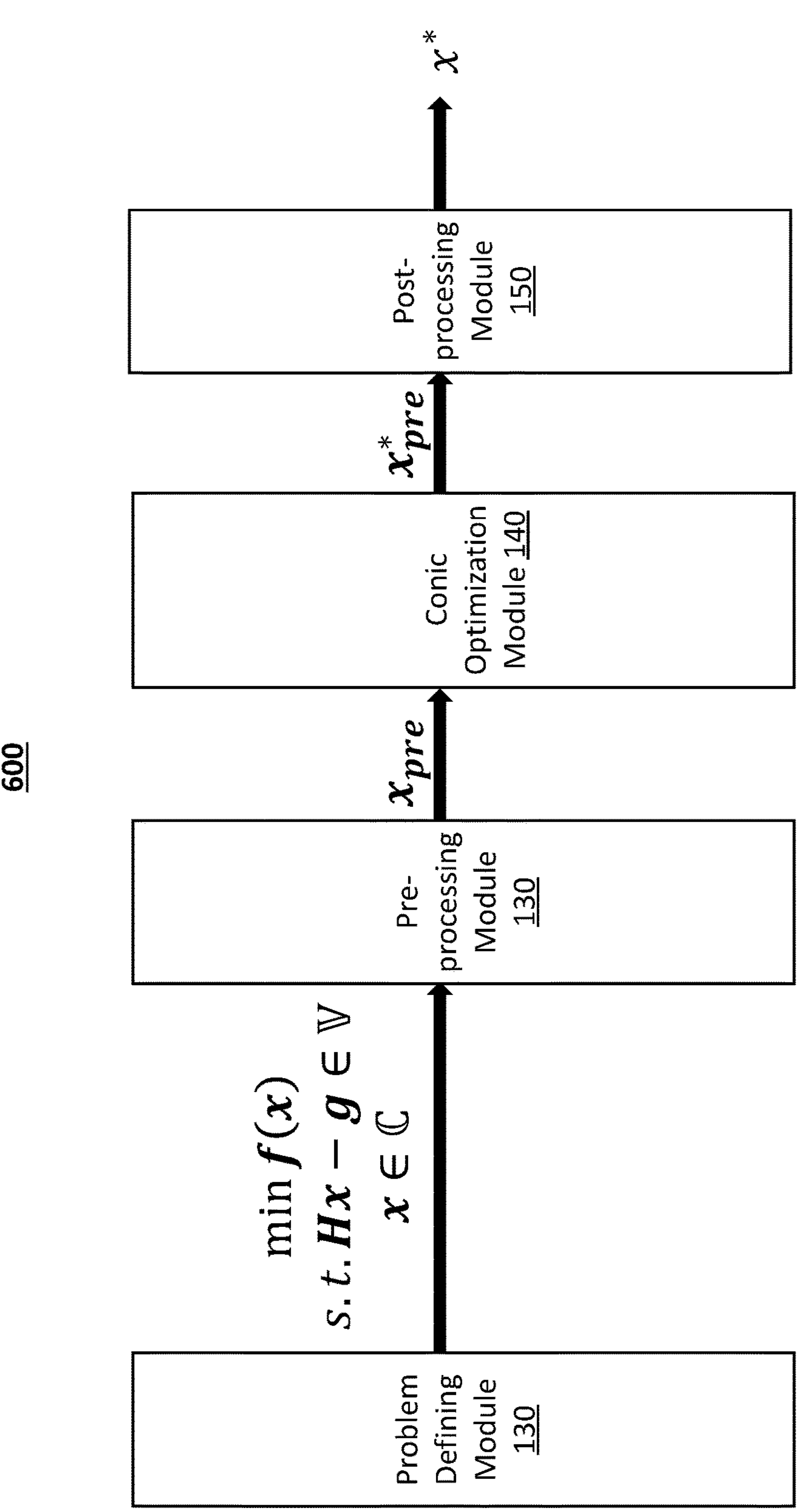
FIG. 6 illustrates an example process of solving a conic optimization problem, in accordance with various embodiments.

FIG. 6 illustrates an example process 600 of solving a conic optimization problem, in accordance with various embodiments. The process 600 may be performed by the conic programming system 100 in FIG. 1. As shown in FIG. 6, the problem defining module 120 provides a conic optimization problem to the pre-processing module 130. The problem defining module 120 defines the objective function, constraints, and decision variables x of the conic optimization problem. The pre-processing module 130 processes the decision variables from the problem defining module 120 and generates pre-processed decision variables $x_{pre}$. The pre-processing module 130 transmits the pre-processed decision variables $x_{pre}$ to the conic optimization module 140. The conic optimization module 140 computes, e.g., based on the pre-processed decision variables $x_{pre}$, decision variables $x^*_{pre}$ by minimizing the objective function within the constraints. In some embodiments, the conic optimization module 140 may encode the pre-processed decision variables $x_{pre}$ in neurons of a spiking neural network and updates the pre-processed decision variables $x_{pre}$ to generate the decision variables $x^*_{pre}$.

The conic optimization module 140 transmits the decision variables $x^*_{pre}$ to the post-processing module 150. The post-processing module 150 converts the decision variables $x^*_{pre}$ to decision variables $x^*$, e.g., by performing a denoising process on the decision variables $x^*_{pre}$. The decision variables $x^*_{pre}$ or the decision variables $x^*$ constitute the solution to the conic optimization problem. The decision variables $x^*$ may be used in various applications, such as MPC, depth estimation, path planning, beamforming, and so on. The conic optimization problem can be edge-level or cloud-based and can be used in resource-constrained settings, as the usage of the spiking neural network can reduce the amount of power consumed by solving the conic optimization problem.

Example Applications of Conic Programming

Figure 7A:
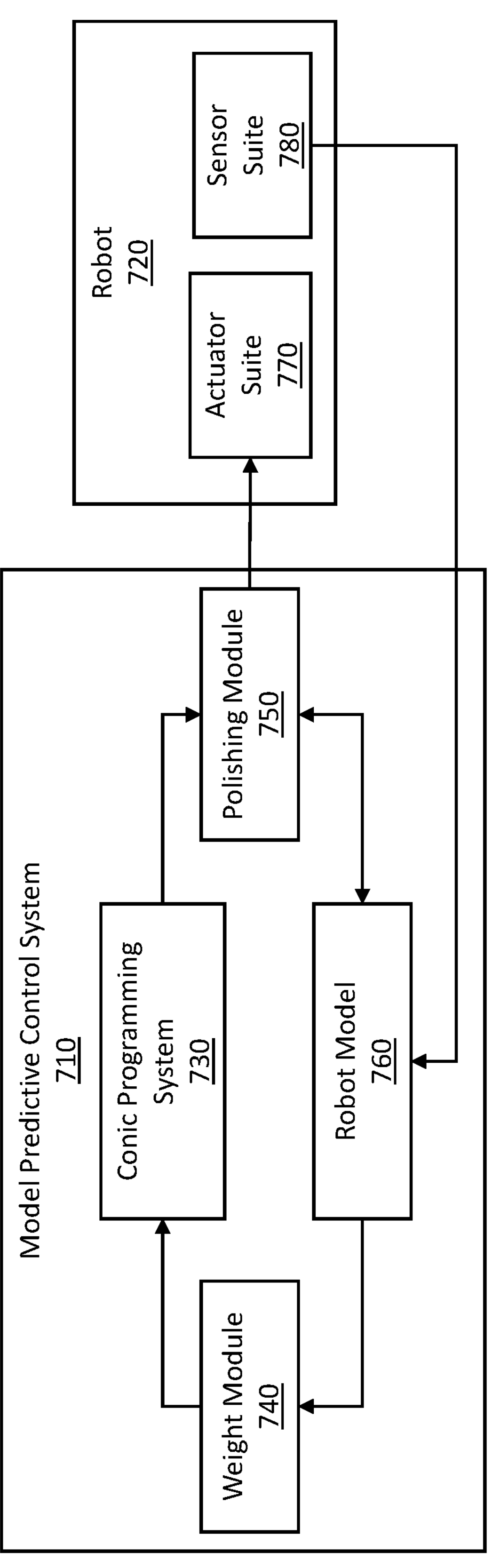
FIG. 7A illustrates an example application of a conic programming system in a model predictive control (MPC) system, in accordance with various embodiments.

FIG. 7A illustrates an example application of a conic programming system 730 in a MPC system 710, in accordance with various embodiments. The MPC system 710 can predict new inputs or control signals for a robot 720 based on target behavior or predicted dynamics of the robot 720. The conic programming system 730 is a component of the MPC system 710 and can solve quadratic programs during the operation of the MPC system 710. In addition to the conic programming system 730, the MPC system 710 also includes a weight module 740, a polishing module 750, and a robot model 760. In other embodiments, the MPC system 710 may include different, fewer, or more components. Further, functionality attributed to a component of the MPC system 710 may be accomplished by a different component included in the MPC system 710 or by a different system.

In some embodiments, the conic programming system 730 may use a spiking neural network to solve quadratic programs. The conic programming system 730 may be an embodiment of the conic programming system 100 in FIG. 1. An example of the spiking neural network may be the conic optimization model 220 in FIG. 2 or the neural network 300 in FIG. 3. The spiking neural network may be deployed by using a hardware that integrates compute and memory. The hardware may be capable of sparse communication or fine-grained parallelism. In some embodiments, the hardware may include the compute block 500 in FIG. 5.

The weight module 740 provides weights for the quadratic program to the conic programming system 730. The weights for the quadratic program may be received from the robot model 760. The robot model 760 may be a linearization of the system dynamics and a quadratized version of the cost function at the time of execution. After the conic programming system 730 solves the quadratic program, the conic programming system 730 may send the solution of the quadratic program to the polishing module 750. The polishing module 750 may perform line search and further minimize the cost function before the control signal derived from the solution is sent to the robot 720.

The robot 720 can operate based on control signals generated by the MPC system 710. The robot 720 includes an actuator suite 770 and a sensor suite 780. In other embodiments, the robot 720 may include different, fewer, or more components. For example, the robot 720 may include mechanical components that can move as being driven by the actuator suite 770. As another example, the robot 720 may include the MPC system 710. The actuator suite 770 may include one or more actuators that can drive movements of one or more components of the robot 720. The actuator suite 770 may receive control signals from the MPC system 710 and actuate one or more components of the robot 720 based on the control signals. The sensor suite 780 may include one or more sensors that can detect the environment where the robot 720 operates or detect one or more components of the robot 720. The sensor suite 780 may provide sensor data that can be used to generate the robot model 760.

In an example, the robot 720 may use the MPC system 710 for trajectory optimization in autonomous locomotion. Where the MPC system 710 may follow a specific trajectory and output appropriate control signals for the same. In another example, the robot 720 may use the MPC system 710 for trajectory optimization and landing in aerial- or space-flight, which may focus on tracking small celestial objects or landing a spacecraft softly and precisely on a planet's surface. In yet another example, the robot 720 (or a different system) may use the MPC system 710 for thermostats or chemical processes.

Figure 7B:
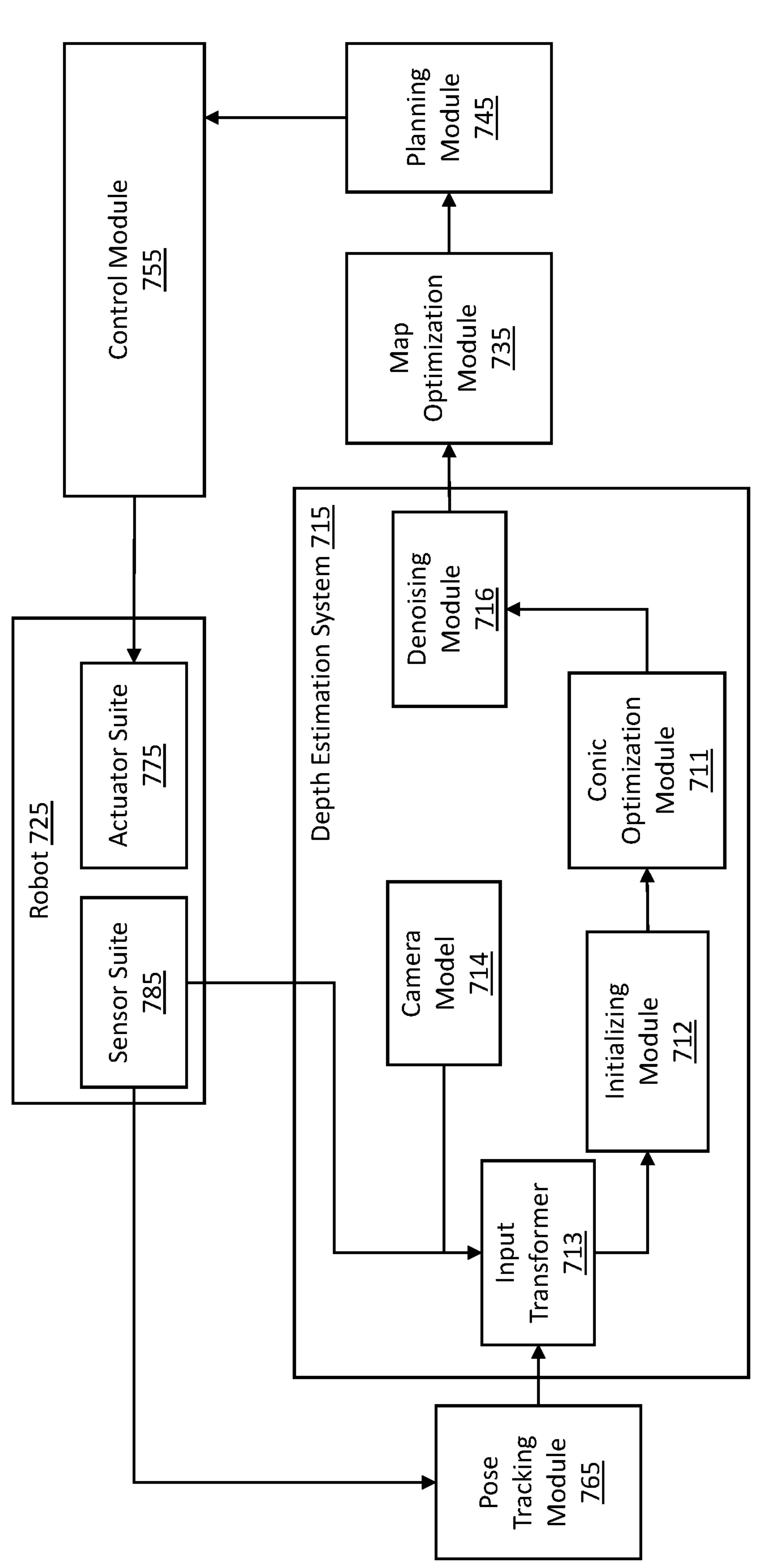
FIG. 7B illustrates an example application of a conic optimization module in a depth estimation system, in accordance with various embodiments.

FIG. 7B illustrates an example application of a conic optimization module 711 in a depth estimation system 715, in accordance with various embodiments. The depth estimation system 715 may generate depth maps of environments where a robot 725 operates. The depth estimation system 715 may be a part of a SLAM (Simultaneous Localization and Mapping) system that functions in real-time. Depth estimation may contain a conic optimization problem at its center. The conic optimization problem may be a quadratic program. In addition to the conic optimization module 711, the depth estimation system 715 also includes an initializing module 712, an input transformer 713, a camera model 714, and a denoising module 716. In other embodiments, the depth estimation system 715 may include different, fewer, or more components. Further, functionality attributed to a component of the depth estimation system 715 may be accomplished by a different component included in the depth estimation system 715 or by a different system.

In some embodiments, the conic optimization module 711 may use a spiking neural network to solve quadratic programs. The conic optimization module 711 may be an embodiment of the conic optimization module 140 in FIGS. 1 and 2. An example of the spiking neural network may be the conic optimization model 220 in FIG. 2 or the neural network 300 in FIG. 3. The spiking neural network may be deployed by using a hardware that integrates compute and memory. The hardware may be capable of sparse communication or fine-grained parallelism. In some embodiments, the hardware may include the compute block 500 in FIG. 5.

The initializing module 712 may be an embodiment of the problem defining module 120 in FIG. 1. The initializing module 712 may define a conic program (e.g., a quadratic program) to be solved by the conic optimization module 711. The input transformer 713 may process data from the pose tracking module 765 and the camera model 714, e.g., in embodiments where the data cannot be directly used by the initializing module 712 to define the conic program. The camera model 714 may be a model generated based on one or more images captured by one or more cameras. The model may be a model of the robot 725, a model of an environment in which the robot 725 operates, or a model of an object in an environment in which the robot 725 operates. The pose tracking module 765 tracks poses of the robot 725 or one or more other objects based on sensor data generated by the sensor suite 785. The initializing module 712 may be an embodiment of the pre-processing module 130 in FIG. 1.

The denoising module 716 may process an output from the conic optimization module 711, which may be the solution to the conic program, e.g., in embodiments where the map optimization module 735 cannot directly process the output of the conic optimization module 711. For instance, the denoising module 716 may reduce or even eliminate noise in the output of the conic optimization module 711. The denoising module 716 may be an embodiment of the post-processing module 150 in FIG. 1. In other embodiments, the depth estimation system 715 may include different, fewer, or more components.

The depth estimation system 715 may transmit depth maps to a map optimization module 735. The map optimization module 735 may optimize the depth maps so that the depth maps can be used by a planning module 745 to plan behaviors of the robot 725. The planning module 745 may output an operation plan for an operation of the robot 725. The operation plan may specify one or more behaviors of the robot 725 during the operation. The planning module 745 may provide the operation plan to the control module 755, which will generate control signals.

The robot 725 can operate based on control signals from the control module 755, which are generated based on depth maps generated by the depth estimation system 715. The robot 725 includes an actuator suite 775 and a sensor suite 785. In other embodiments, the robot 725 may include different, fewer, or more components. For example, the robot 725 may include mechanical components that can move as being driven by the actuator suite 775. As another example, the robot 725 may include the depth estimation system 715, the map optimization module 735, the planning module 745, the control module 755, the pose tracking module 765, other components, or some combination thereof. The actuator suite 775 may include one or more actuators that can actuate one or more components of the robot 725. The actuator suite 775 may receive control signals from the control module 755 and actuate one or more components of the robot 725 based on the control signals. The sensor suite 785 may include one or more sensors that can detect the environment where the robot 725 operates or detect one or more components of the robot 725.

Figure 8A:
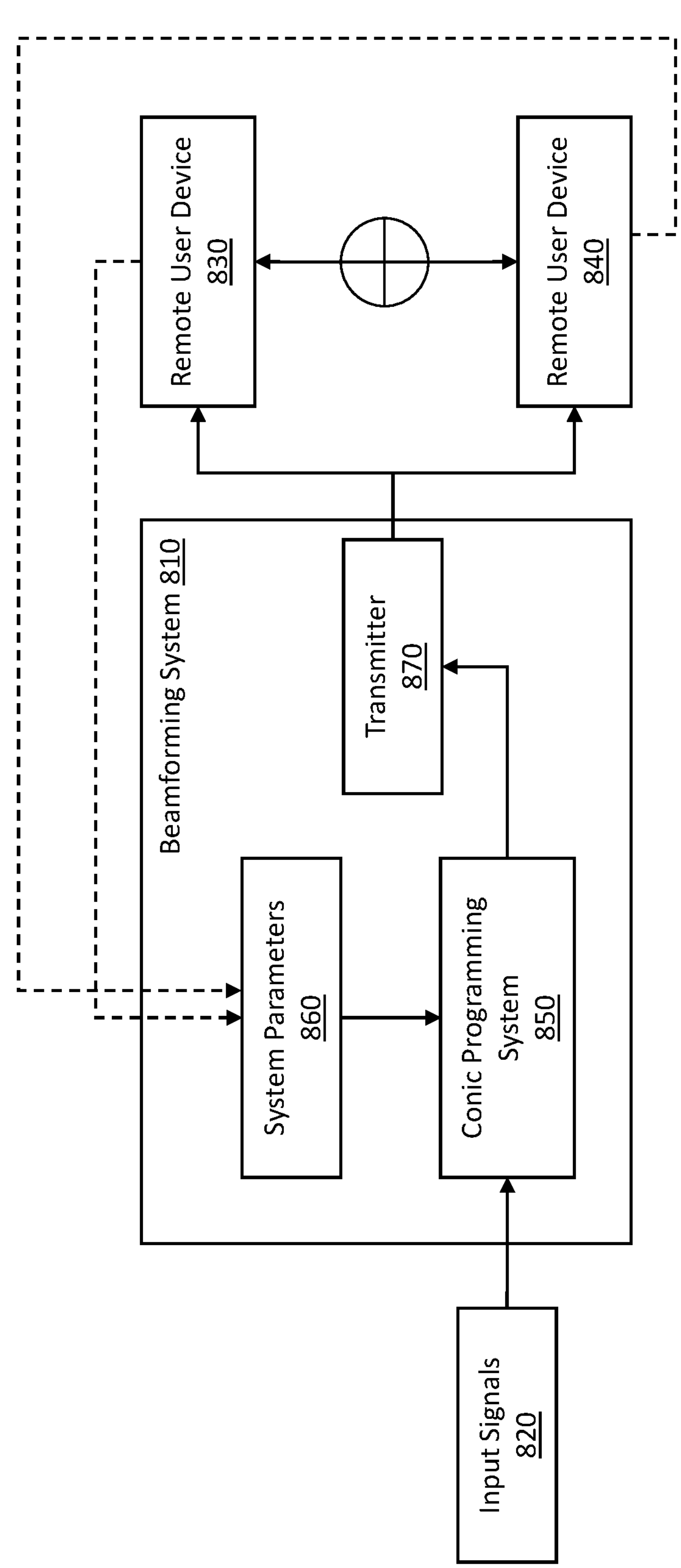
FIG. 8A illustrates an example application of a conic programming system in a beamforming system, in accordance with various embodiments.

FIG. 8A illustrates an example application of a conic programming system 850 in a beamforming system 810, in accordance with various embodiments. The beamforming system 810 can solve beamforming problems (e.g., downlink beamforming problems) in communication systems. The conic programming system 850 is a component of the beamforming system 810 and can solve second order conic programs during the operation of the beamforming system 810. In addition to the conic programming system 850, the beamforming system 810 also includes a transmitter 870. In other embodiments, the beamforming system 810 may include different, fewer, or more components. Further, functionality attributed to a component of the beamforming system 810 may be accomplished by a different component included in the beamforming system 810 or by a different system.

The conic programming system 850 may be an embodiment of the conic programming system 100 in FIG. 1. In some embodiments, the conic programming system 730 may use a spiking neural network to solve quadratic programs. An example of the spiking neural network may be the conic optimization model 220 in FIG. 2 or the neural network 300 in FIG. 3. The spiking neural network may be deployed by using a hardware that integrates compute and memory. The hardware may be capable of sparse communication or fine-grained parallelism. In some embodiments, the hardware may include the compute block 500 in FIG. 5. The conic programming system 850 can be used to solve the second order conic programs to minimize the total power of transmission during the beamforming. The spiking neural network can be used to speed beamforming of signals at lower powers while also computing beamforming coefficients for multiple user devices and inputs quickly.

In the embodiments of FIG. 8A, the conic programming system 850 may solve second order conic programs based on input signals 820 and system parameters 860. The system parameters 860 may be generated by remote user devices 830 and 840 that are associated with the beamforming system 810. The system parameters 860 may include, for example, noise variance, channel vectors, and so on. The system parameters 860 may be known to the base station which allows to set up second order conic programs that needs be solved to appropriately beamform the input signals 820.

The transmitter 870 can receive outputs of the conic programming system 850, e.g., solutions to the second order conic programs. The transmitter 870 may use the solutions to the second order conic programs to speed beamforming of signals at lower powers. The remote user devices 830 and 840 may receive signals from the transmitter 870. The antennas in the remote user devices 830 and 840 can output the signals, e.g., to other user devices.

Figure 8B:
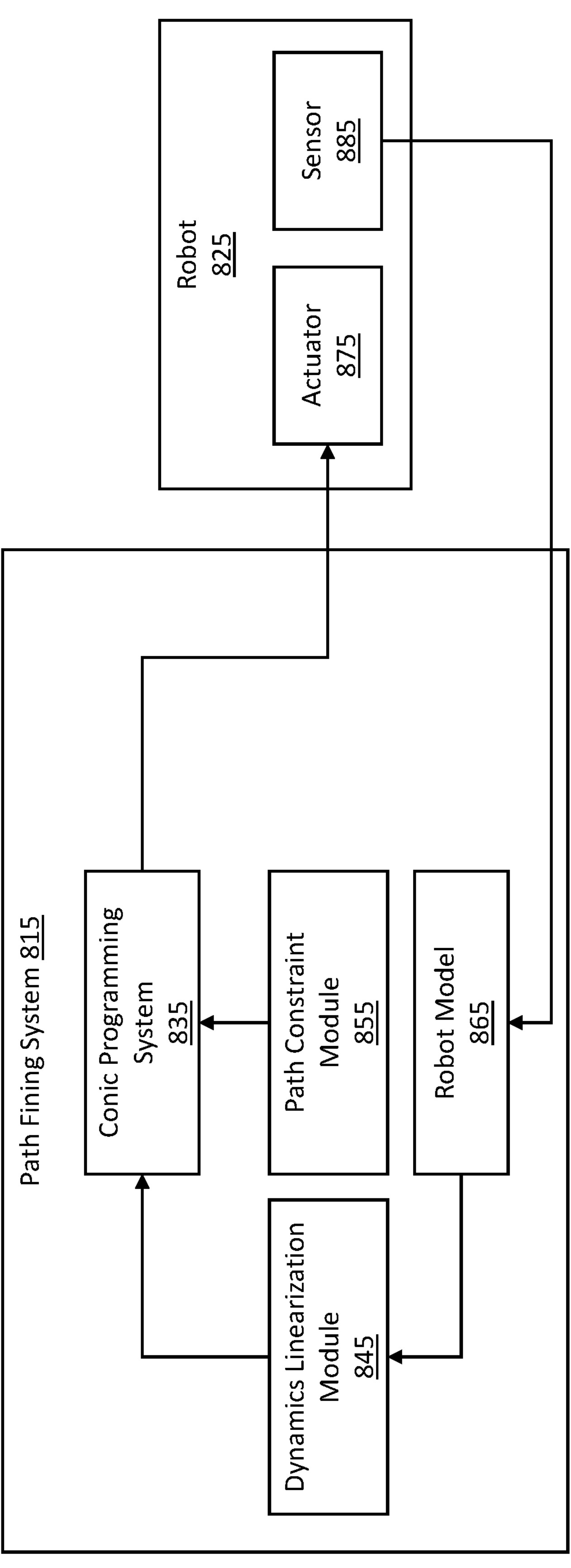
FIG. 8B illustrates an example application of a conic programming system in a path finding system, in accordance with various embodiments.

FIG. 8B illustrates an example application of a conic programming system 835 in a path finding system 815, in accordance with various embodiments. The path finding system 815 can plan paths for a robot 825. For instance, the path finding system 815 can determine a path for a robot moving from point A to point B while avoiding obstacles. Path planning may be framed as conic programs, such as second order conic programs. The conic programming system 835 is a component of the path finding system 815 and can solve conic programs during the operation of the path finding system 815. The path constraint and system dynamics may be linearized and set as constraints of a conic optimization problem. In addition to the conic programming system 835, the path finding system 815 also includes a dynamic linearization module 845, a path constraint module 855, and a robot model 865. Further, functionality attributed to a component of the path finding system 815 may be accomplished by a different component included in the path finding system 815 or by a different system.

The conic programming system 835 can output, by solving a conic program, the appropriate control signals that lead to the optimal path. The conic programming system 835 may be an embodiment of the conic programming system 100 in FIG. 1. In some embodiments, the conic programming system 835 may use a spiking neural network to solve quadratic programs. An example of the spiking neural network may be the conic optimization model 220 in FIG. 2 or the neural network 300 in FIG. 3. The spiking neural network may be deployed by using a hardware that integrates compute and memory. The hardware may be capable of sparse communication or fine-grained parallelism. In some embodiments, the hardware may include the compute block 500 in FIG. 5.

The dynamic linearization module 845 may receive system dynamics from the robot model 865 and linearize the system dynamics. The dynamic linearization module 845 may send the linearized system dynamics to the conic programming system 835. The path constraint module 855 may send path constraints to the conic programming system 835. The conic programming system 835 can use the linearized system dynamics and path constraints to solve one or more conic programs and to generate control signals to be used to control the operation of the robot 825.

The robot 825 can operate based on the solutions to the conic programs, which are from the conic programming system 835. The robot 825 includes an actuator suite 875 and a sensor suite 885. In other embodiments, the robot 825 may include different, fewer, or more components. For example, the robot 825 may include mechanical components that can move as being driven by the actuator suite 875. As another example, the robot 825 may include the path finding system 815. The actuator suite 875 may include one or more actuators that can actuate one or more components of the robot 825. The actuator suite 875 may receive control signals from the conic programming system 835 and actuate one or more components of the robot 825 based on the control signals. The sensor suite 885 may include one or more sensors that can detect the environment where the robot 825 operates or detect one or more components of the robot 825. The sensor suite 885 may provide sensor data used to generate the robot model 865. The robot model 864 may include a model of the robot 825, a model of an environment in which the robot 825 operates, or a model one or more objects in an environment in which the robot 825 operates.

Example Method of Conic Optimization

Figure 9:
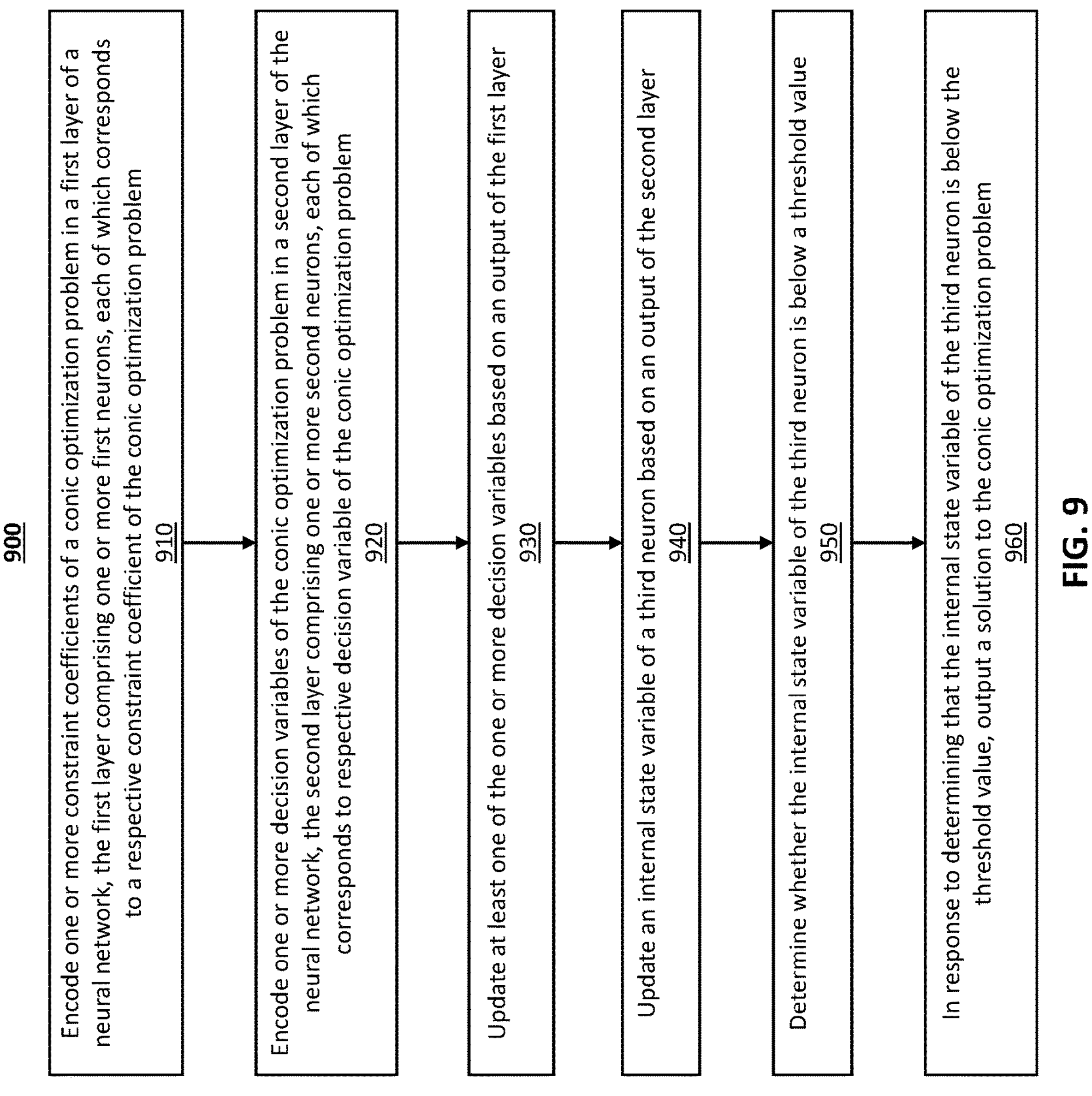
FIG. 9 is a flowchart showing a method of solving a conic optimization problem, in accordance with various embodiments.

FIG. 9 is a flowchart showing a method 900 of solving a conic optimization problem, in accordance with various embodiments. The method 900 may be performed by the conic optimization module 140 in FIGS. 1 and 2. Although the method 900 is described with reference to the flowchart illustrated in FIG. 9, many other methods for solving conic optimization problems may alternatively be used. For example, the order of execution of the steps in FIG. 9 may be changed. As another example, some of the steps may be changed, eliminated, or combined.

The conic optimization module 140 encodes 910 one or more constraint coefficients of a conic optimization problem in a first layer of a neural network. The neural network may have a spiking neuromorphic architecture. The first layer includes one or more first neurons, each of which corresponds to a respective constraint coefficient of the conic optimization problem.

The conic optimization module 140 encodes 920 one or more decision variables of the conic optimization problem in a second layer of the neural network. The second layer includes one or more second neurons, each of which corresponds to respective decision variable of the conic optimization problem. In some embodiments, a first neuron is configured to receive data from a second neuron and to transmit data to the second neuron.

The conic optimization module 140 updates 930 at least one of the one or more decision variables based on an output of the first layer. In some embodiments, the conic optimization module 140 inputs a biasing input into at least one of the one or more first neurons that computes the output of the first layer based on the biasing input. In some embodiments, the conic optimization module 140 determines whether a constraint coefficient corresponding to a first neuron meets a criterion. The conic optimization module 140 transmits the constraint coefficient corresponding to the first neuron to at least one of the one or more second neurons, in response to determining that the constraint coefficient corresponding to the first neuron meets the criterion.

In some embodiments, the output of the first layer is from a first neuron. The conic optimization module 140 updates a decision variable corresponding to a second neuron based on a product of multiplying the output of the first layer with a weight corresponding to a connection between the first neuron and the second neuron. In some embodiments, the conic optimization module 140 updates at least one of the one or more constraint coefficients based on an output of the second layer.

The conic optimization module 140 updates 940 an internal state variable of a third neuron based on an output of the second layer. In some embodiments, the third neuron is in a third layer of the neural network. The second layer is between the first layer and the third layer.

The conic optimization module 140 determines 950 whether the internal state variable of the third neuron is below a threshold value.

The conic optimization module 140 outputs 960 a solution to the conic optimization problem, in response to determining that the internal state variable of the third neuron is below the threshold value.

Example Computing Device

Figure 10:
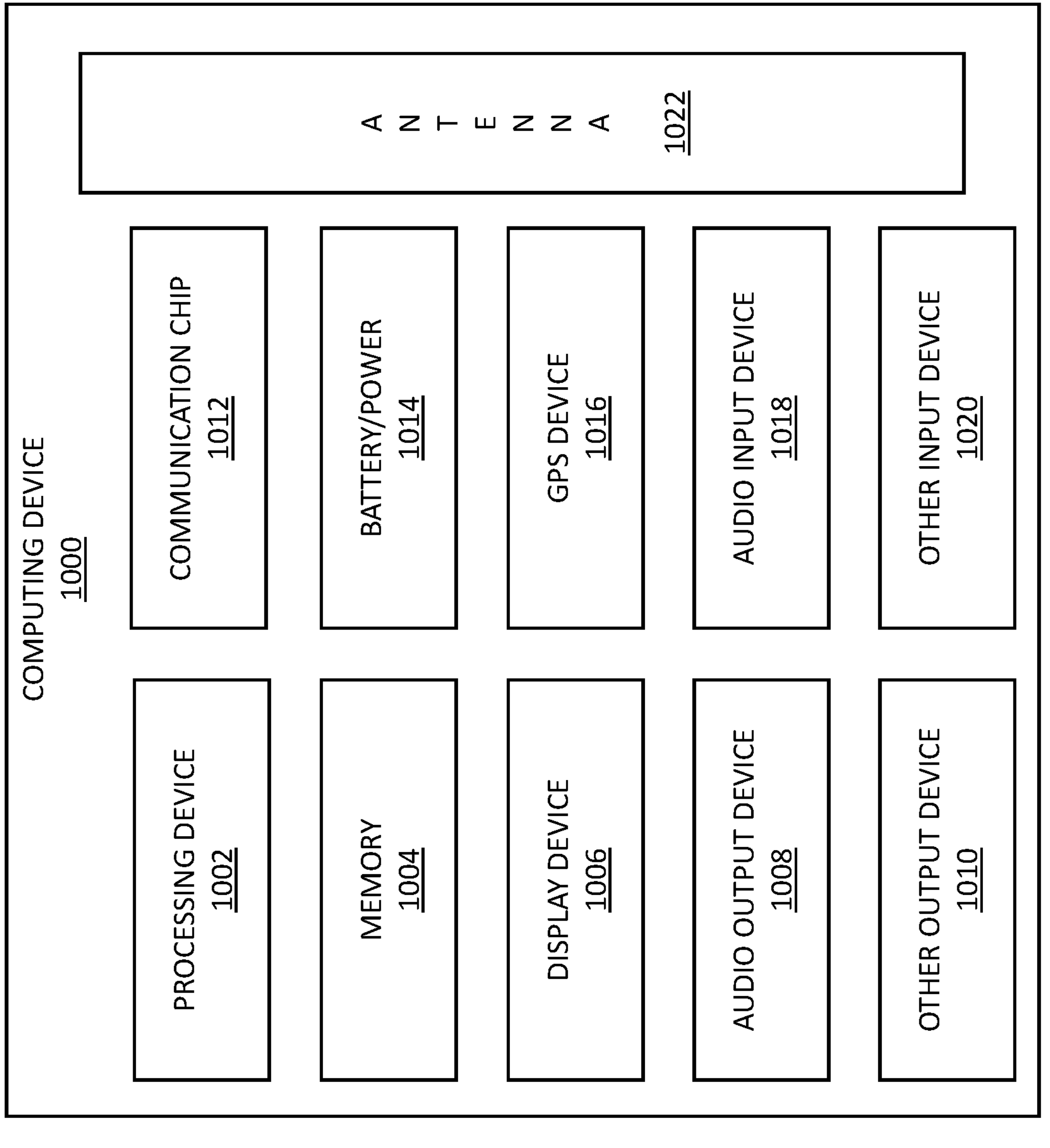
FIG. 10 is a block diagram of an example computing device, in accordance with various embodiments.

FIG. 10 is a block diagram of an example computing device 1000, in accordance with various embodiments. In some embodiments, the computing device 1000 may be used for at least part of the conic programming system 100 in FIG. 1. A number of components are illustrated in FIG. 10 as included in the computing device 1000, but any one or more of these components may be omitted or duplicated, as suitable for the application. In some embodiments, some or all of the components included in the computing device 1000 may be attached to one or more motherboards. In some embodiments, some or all of these components are fabricated onto a single system on a chip (SoC) die. Additionally, in various embodiments, the computing device 1000 may not include one or more of the components illustrated in FIG. 10, but the computing device 1000 may include interface circuitry for coupling to the one or more components. For example, the computing device 1000 may not include a display device 1006, but may include display device interface circuitry (e.g., a connector and driver circuitry) to which a display device 1006 may be coupled. In another set of examples, the computing device 1000 may not include an audio input device 1018 or an audio output device 1008, but may include audio input or output device interface circuitry (e.g., connectors and supporting circuitry) to which an audio input device 1018 or audio output device 1008 may be coupled.

The computing device 1000 may include a processing device 1002 (e.g., one or more processing devices). The processing device 1002 processes electronic data from registers and/or memory to transform that electronic data into other electronic data that may be stored in registers and/or memory. The computing device 1000 may include a memory 1004, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 1004 may include memory that shares a die with the processing device 1002. In some embodiments, the memory 1004 includes one or more non-transitory computer-readable media storing instructions executable for occupancy mapping or collision detection, e.g., the method 900 described above in conjunction with FIG. 9 or some operations performed by the conic programming system 100 or the conic optimization module 140. The instructions stored in the one or more non-transitory computer-readable media may be executed by the processing device 1002.

In some embodiments, the computing device 1000 may include a communication chip 1012 (e.g., one or more communication chips). For example, the communication chip 1012 may be configured for managing wireless communications for the transfer of data to and from the computing device 1000. The term "wireless" and its derivatives may be used to describe circuits, devices, systems, methods, techniques, communications channels, etc., that may communicate data using modulated electromagnetic radiation through a nonsolid medium. The term does not imply that the associated devices do not contain any wires, although in some embodiments they might not.

The communication chip 1012 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1012 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1012 may operate in accordance with code-division multiple access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1012 may operate in accordance with other wireless protocols in other embodiments. The computing device 1000 may include an antenna 1022 to facilitate wireless communications and/or to receive other wireless communications (such as AM or FM radio transmissions).

In some embodiments, the communication chip 1012 may manage wired communications, such as electrical, optical, or any other suitable communication protocols (e.g., the Ethernet). As noted above, the communication chip 1012 may include multiple communication chips. For instance, a first communication chip 1012 may be dedicated to shorter-range wireless communications such as Wi-Fi or Bluetooth, and a second communication chip 1012 may be dedicated to longer-range wireless communications such as global positioning system (GPS), EDGE, GPRS, CDMA, WiMAX, LTE, EV-DO, or others. In some embodiments, a first communication chip 1012 may be dedicated to wireless communications, and a second communication chip 1012 may be dedicated to wired communications.

The computing device 1000 may include battery/power circuitry 1014. The battery/power circuitry 1014 may include one or more energy storage devices (e.g., batteries or capacitors) and/or circuitry for coupling components of the computing device 1000 to an energy source separate from the computing device 1000 (e.g., AC line power).

The computing device 1000 may include a display device 1006 (or corresponding interface circuitry, as discussed above). The display device 1006 may include any visual indicators, such as a heads-up display, a computer monitor, a projector, a touchscreen display, a liquid crystal display (LCD), a light-emitting diode display, or a flat panel display, for example.

The computing device 1000 may include an audio output device 1008 (or corresponding interface circuitry, as discussed above). The audio output device 1008 may include any device that generates an audible indicator, such as speakers, headsets, or earbuds, for example.

The computing device 1000 may include an audio input device 1018 (or corresponding interface circuitry, as discussed above). The audio input device 1018 may include any device that generates a signal representative of a sound, such as microphones, microphone arrays, or digital instruments (e.g., instruments having a musical instrument digital interface (MIDI) output).

The computing device 1000 may include a GPS device 1016 (or corresponding interface circuitry, as discussed above). The GPS device 1016 may be in communication with a satellite-based system and may receive a location of the computing device 1000, as known in the art.

The computing device 1000 may include another output device 1010 (or corresponding interface circuitry, as discussed above). Examples of the other output device 1010 may include an audio codec, a video codec, a printer, a wired or wireless transmitter for providing information to other devices, or an additional storage device.

The computing device 1000 may include another input device 1020 (or corresponding interface circuitry, as discussed above). Examples of the other input device 1020 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1000 may have any desired form factor, such as a handheld or mobile computer system (e.g., a cell phone, a smart phone, a mobile internet device, a music player, a tablet computer, a laptop computer, a netbook computer, an ultrabook computer, a PDA (personal digital assistant), an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 1000 may be any other electronic device that processes data.

Selected Examples

The following paragraphs provide various examples of the embodiments disclosed herein.

Example 1 provides a computer-implemented method, including encoding one or more constraint coefficients of a conic optimization problem in a first layer of a neural network, the first layer including one or more first neurons, each of which corresponds to a respective constraint coefficient of the conic optimization problem; encoding one or more decision variables of the conic optimization problem in a second layer of the neural network, the second layer including one or more second neurons, each of which corresponds to respective decision variable of the conic optimization problem; updating at least one of the one or more decision variables based on an output of the first layer; updating an internal state variable of a third neuron based on an output of the second layer; determining whether the internal state variable of the third neuron is below a threshold value; and in response to determining that the internal state variable of the third neuron is below the threshold value, outputting a solution to the conic optimization problem.

Example 2 provides the computer-implemented method of example 1, further including inputting a biasing input into at least one of the one or more first neurons that computes the output of the first layer based on the biasing input.

Example 3 provides the computer-implemented method of example 1 or 2, where the third neuron is in a third layer of the neural network, and the second layer is between the first layer and the third layer.

Example 4 provides the computer-implemented method of any of the preceding examples, where updating at least one of the one or more decision variables based on an output of the first layer includes determining whether a constraint coefficient corresponding to a first neuron meets a criterion; and in response to determining that the constraint coefficient corresponding to the first neuron meets the criterion, transmitting the constraint coefficient corresponding to the first neuron to at least one of the one or more second neurons.

Example 5 provides the computer-implemented method of any of the preceding examples, where the output of the first layer is from a first neuron, and updating at least one of the one or more decision variables based on an output of the first layer includes updating a decision variable corresponding to a second neuron based on a product of multiplying the output of the first layer with a weight corresponding to a connection between the first neuron and the second neuron.

Example 6 provides the computer-implemented method of any of the preceding examples, where a first neuron is configured to receive data from a second neuron and to transmit data to the second neuron.

Example 7 provides the computer-implemented method of any of the preceding examples, further including updating at least one of the one or more constraint coefficients based on an output of the second layer.

Example 8 provides one or more non-transitory computer-readable media storing instructions executable to perform operations, the operations including encoding one or more constraint coefficients of a conic optimization problem in a first layer of a neural network, the first layer including one or more first neurons, each of which corresponds to a respective constraint coefficient of the conic optimization problem; encoding one or more decision variables of the conic optimization problem in a second layer of the neural network, the second layer including one or more second neurons, each of which corresponds to respective decision variable of the conic optimization problem; updating at least one of the one or more decision variables based on an output of the first layer; updating an internal state variable of a third neuron based on an output of the second layer; determining whether the internal state variable of the third neuron is below a threshold value; and in response to determining that the internal state variable of the third neuron is below the threshold value, outputting a solution to the conic optimization problem.

Example 9 provides the one or more non-transitory computer-readable media of example 8, where the operations further include inputting a biasing input into at least one of the one or more first neurons that computes the output of the first layer based on the biasing input.

Example 10 provides the one or more non-transitory computer-readable media of example 8 or 9, where the third neuron is in a third layer of the neural network, and the second layer is between the first layer and the third layer.

Example 11 provides the one or more non-transitory computer-readable media of any one of examples 8-10, where updating at least one of the one or more decision variables based on an output of the first layer includes determining whether a constraint coefficient corresponding to a first neuron meets a criterion; and in response to determining that the constraint coefficient corresponding to the first neuron meets the criterion, transmitting the constraint coefficient corresponding to the first neuron to at least one of the one or more second neurons.

Example 12 provides the one or more non-transitory computer-readable media of any one of examples 8-11, where the output of the first layer is from a first neuron, and updating at least one of the one or more decision variables based on an output of the first layer includes updating a decision variable corresponding to a second neuron based on a product of multiplying the output of the first layer with a weight corresponding to a connection between the first neuron and the second neuron.

Example 13 provides the one or more non-transitory computer-readable media of any one of examples 8-12, where a first neuron is configured to receive data from a second neuron and to transmit data to the second neuron.

Example 14 provides the one or more non-transitory computer-readable media of any one of examples 8-13, where the operations further include updating at least one of the one or more constraint coefficients based on an output of the second layer.

Example 15 provides an apparatus, including a computer processor for executing computer program instructions; and a non-transitory computer-readable memory storing computer program instructions executable by the computer processor to perform operations including encoding one or more constraint coefficients of a conic optimization problem in a first layer of a neural network, the first layer including one or more first neurons, each of which corresponds to a respective constraint coefficient of the conic optimization problem, encoding one or more decision variables of the conic optimization problem in a second layer of the neural network, the second layer including one or more second neurons, each of which corresponds to respective decision variable of the conic optimization problem, updating at least one of the one or more decision variables based on an output of the first layer, updating an internal state variable of a third neuron based on an output of the second layer, determining whether the internal state variable of the third neuron is below a threshold value, and in response to determining that the internal state variable of the third neuron is below the threshold value, outputting a solution to the conic optimization problem.

Example 16 provides the apparatus of example 15, where the operations further include inputting a biasing input into at least one of the one or more first neurons that computes the output of the first layer based on the biasing input.

Example 17 provides the apparatus of example 15 or 16, where the third neuron is in a third layer of the neural network, and the second layer is between the first layer and the third layer.

Example 18 provides the apparatus of any one of examples 15-17, where updating at least one of the one or more decision variables based on an output of the first layer includes determining whether a constraint coefficient corresponding to a first neuron meets a criterion; and in response to determining that the constraint coefficient corresponding to the first neuron meets the criterion, transmitting the constraint coefficient corresponding to the first neuron to at least one of the one or more second neurons.

Example 19 provides the apparatus of any one of examples 15-18, where the output of the first layer is from a first neuron, and updating at least one of the one or more decision variables based on an output of the first layer includes updating a decision variable corresponding to a second neuron based on a product of multiplying the output of the first layer with a weight corresponding to a connection between the first neuron and the second neuron.

Example 20 provides the apparatus of any one of examples 15-19, where a first neuron is configured to receive data from a second neuron and to transmit data to the second neuron.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A computer-implemented method, comprising:

encoding one or more constraint coefficients of a conic optimization problem in a first layer of a neural network, the first layer comprising one or more first neurons, each of which corresponds to a respective constraint coefficient of the conic optimization problem;

encoding one or more decision variables of the conic optimization problem in a second layer of the neural network, the second layer comprising one or more second neurons, each of which corresponds to respective decision variable of the conic optimization problem;

updating at least one of the one or more decision variables based on an output of the first layer;

updating an internal state variable of a third neuron based on an output of the second layer;

determining whether the internal state variable of the third neuron is below a threshold value; and in response to determining that the internal state variable of the third neuron is below the threshold value, outputting a solution to the conic optimization problem.

2. The computer-implemented method of claim 1, further comprising:

inputting a biasing input into at least one of the one or more first neurons that computes the output of the first layer based on the biasing input.

3. The computer-implemented method of claim 1, wherein the third neuron is in a third layer of the neural network, and the second layer is between the first layer and the third layer.

4. The computer-implemented method of claim 1, wherein updating at least one of the one or more decision variables based on an output of the first layer comprises:

determining whether a constraint coefficient corresponding to a first neuron meets a criterion; and in response to determining that the constraint coefficient corresponding to the first neuron meets the criterion, transmitting the constraint coefficient corresponding to the first neuron to at least one of the one or more second neurons.

5. The computer-implemented method of claim 1, wherein the output of the first layer is from a first neuron, and updating at least one of the one or more decision variables based on an output of the first layer comprises:

updating a decision variable corresponding to a second neuron based on a product of multiplying the output of the first layer with a weight corresponding to a connection between the first neuron and the second neuron.

6. The computer-implemented method of claim 1, wherein a first neuron is configured to receive data from a second neuron and to transmit data to the second neuron.

7. The computer-implemented method of claim 1, further comprising:

updating at least one of the one or more constraint coefficients based on an output of the second layer.

8. One or more non-transitory computer-readable media storing instructions executable to perform operations, the operations comprising:

encoding one or more constraint coefficients of a conic optimization problem in a first layer of a neural network, the first layer comprising one or more first neurons, each of which corresponds to a respective constraint coefficient of the conic optimization problem;

encoding one or more decision variables of the conic optimization problem in a second layer of the neural network, the second layer comprising one or more second neurons, each of which corresponds to respective decision variable of the conic optimization problem;

updating at least one of the one or more decision variables based on an output of the first layer;

updating an internal state variable of a third neuron based on an output of the second layer;

determining whether the internal state variable of the third neuron is below a threshold value; and in response to determining that the internal state variable of the third neuron is below the threshold value, outputting a solution to the conic optimization problem.

9. The one or more non-transitory computer-readable media of claim 8, wherein the operations further comprise:

inputting a biasing input into at least one of the one or more first neurons that computes the output of the first layer based on the biasing input.

10. The one or more non-transitory computer-readable media of claim 8, wherein the third neuron is in a third layer of the neural network, and the second layer is between the first layer and the third layer.

11. The one or more non-transitory computer-readable media of claim 8, wherein updating at least one of the one or more decision variables based on an output of the first layer comprises:

determining whether a constraint coefficient corresponding to a first neuron meets a criterion; and in response to determining that the constraint coefficient corresponding to the first neuron meets the criterion, transmitting the constraint coefficient corresponding to the first neuron to at least one of the one or more second neurons.

12. The one or more non-transitory computer-readable media of claim 8, wherein the output of the first layer is from a first neuron, and updating at least one of the one or more decision variables based on an output of the first layer comprises:

updating a decision variable corresponding to a second neuron based on a product of multiplying the output of the first layer with a weight corresponding to a connection between the first neuron and the second neuron.

13. The one or more non-transitory computer-readable media of claim 8, wherein a first neuron is configured to receive data from a second neuron and to transmit data to the second neuron.

14. The one or more non-transitory computer-readable media of claim 8, wherein the operations further comprise:

updating at least one of the one or more constraint coefficients based on an output of the second layer.

15. An apparatus, comprising:

a computer processor for executing computer program instructions; and a non-transitory computer-readable memory storing computer program instructions executable by the computer processor to perform operations comprising:

encoding one or more constraint coefficients of a conic optimization problem in a first layer of a neural network, the first layer comprising one or more first neurons, each of which corresponds to a respective constraint coefficient of the conic optimization problem, encoding one or more decision variables of the conic optimization problem in a second layer of the neural network, the second layer comprising one or more second neurons, each of which corresponds to respective decision variable of the conic optimization problem, updating at least one of the one or more decision variables based on an output of the first layer, updating an internal state variable of a third neuron based on an output of the second layer, determining whether the internal state variable of the third neuron is below a threshold value, and in response to determining that the internal state variable of the third neuron is below the threshold value, outputting a solution to the conic optimization problem.

16. The apparatus of claim 15, wherein the operations further comprise:

inputting a biasing input into at least one of the one or more first neurons that computes the output of the first layer based on the biasing input.

17. The apparatus of claim 15, wherein the third neuron is in a third layer of the neural network, and the second layer is between the first layer and the third layer.

18. The apparatus of claim 15, wherein updating at least one of the one or more decision variables based on an output of the first layer comprises:

determining whether a constraint coefficient corresponding to a first neuron meets a criterion; and in response to determining that the constraint coefficient corresponding to the first neuron meets the criterion, transmitting the constraint coefficient corresponding to the first neuron to at least one of the one or more second neurons.

19. The apparatus of claim 15, wherein the output of the first layer is from a first neuron, and updating at least one of the one or more decision variables based on an output of the first layer comprises:

updating a decision variable corresponding to a second neuron based on a product of multiplying the output of the first layer with a weight corresponding to a connection between the first neuron and the second neuron.

20. The apparatus of claim 15, wherein a first neuron is configured to receive data from a second neuron and to transmit data to the second neuron.

* * * * *